United States Patent
Choi et al.

(10) Patent No.: US 11,875,540 B2
(45) Date of Patent: Jan. 16, 2024

(54) PROGRESSIVE FAST RECOMPRESSION METHOD AND SYSTEM FOR WAVELET-BASED LARGE-DEFORMED MESH DATA

(71) Applicant: KOREA ADVANCED INSTITUTE OF SCIENCE AND TECHNOLOGY, Daejeon (KR)

(72) Inventors: Sunghee Choi, Daejeon (KR); Yeonghun Kim, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 366 days.

(21) Appl. No.: 17/174,351

(22) Filed: Feb. 12, 2021

(65) Prior Publication Data
US 2021/0375005 A1 Dec. 2, 2021

(30) Foreign Application Priority Data
May 26, 2020 (KR) .......................... 10-2020-0063163

(51) Int. Cl.
G06T 9/00 (2006.01)
G06T 3/40 (2006.01)
G06T 17/20 (2006.01)

(52) U.S. Cl.
CPC ................ *G06T 9/001* (2013.01); *G06T 3/40* (2013.01); *G06T 17/205* (2013.01)

(58) Field of Classification Search
None
See application file for complete search history.

(56) References Cited

U.S. PATENT DOCUMENTS

| | | | | |
|---|---|---|---|---|
| 8,749,556 B2* | 6/2014 | de Aguiar | ............... | H03M 7/30 |
| | | | | 345/473 |
| 9,460,539 B2* | 10/2016 | de Aguiar | ................. | G06T 9/00 |
| 9,747,495 B2* | 8/2017 | Corazza | ............... | G06V 40/176 |
| 9,754,410 B2* | 9/2017 | Hua | .......................... | G06T 7/75 |
| 10,600,243 B2* | 3/2020 | Wampler | ............... | G06T 17/205 |
| 10,636,210 B2* | 4/2020 | Gregory | ................ | G06T 17/205 |
| 10,748,325 B2* | 8/2020 | Corazza | .................. | G06T 15/08 |
| 11,253,338 B2* | 2/2022 | Raslambekov | ....... | G06T 17/205 |
| 11,276,231 B2* | 3/2022 | Chandran | ............ | G06V 10/754 |
| 11,475,603 B2* | 10/2022 | Graziosi | ................ | G06T 9/001 |

(Continued)

FOREIGN PATENT DOCUMENTS

KR 10-2014-0139984 12/2014

OTHER PUBLICATIONS

Naziha Dhibi et al., "Multi-layer compression algorithm for 3D deformed mesh based on multi library wavelet neural network architecture", Multimedia Tools and Applications vol. 76, Oct. 13, 2016.

(Continued)

*Primary Examiner* — Anand P Bhatnagar
(74) *Attorney, Agent, or Firm* — Blank Rome LLP (57) ABSTRACT

Disclosed are a wavelet-based progressive fast recompression method and system for large-deformed mesh data. Given mesh data is compressed. The compressed mesh data is recompressed by propagating part of a deformed mesh to all meshes based on information extracted from the compressed data when the mesh data is deformed.

18 Claims, 10 Drawing Sheets

(56) References Cited

U.S. PATENT DOCUMENTS

| | | | | |
|---|---|---|---|---|
| 2012/0182298 | A1* | 7/2012 | Sun | G06T 17/05 |
| | | | | 345/423 |
| 2020/0021824 | A1* | 1/2020 | Taubman | H04N 19/597 |
| 2022/0005271 | A1* | 1/2022 | Chachek | G06T 13/40 |
| 2023/0093102 | A1* | 3/2023 | Chachek | G06V 20/653 |
| | | | | 345/419 |

OTHER PUBLICATIONS

Mohammadali Hajizadeh et al., "Eigenspace compression: dynamic 3D mesh compression by restoring fine geometry to deformed coarse models", Multimedia Tools and Applications vol. 77, Nov. 14, 2017.

Wavelet-based progressive fast recompression technique for 3D, Yeonghun Kim, Master's Thesis, Dec. 16, 2019.

Wavelet-based progressive fast recompression for large deformed mesh, Yeonghun Kim, Sunghee Choi, https://doi.org/10.1016/j.cad.2020.102859, Apr. 16, 2020.

* cited by examiner

| Algorithm 1: ROI Propagation and Modification |
|---|

Result: New vertex coordinates $V^j_{new}$ and wavelet coefficients $W^j_{new}$ for all level $j$ 1  $V^J_{new} \leftarrow \text{Deform}(V^J)$ ;    ▷ Initialize
2  for $j \leftarrow J-1$ to $j_0$ by $(-1)$ do
3      for non-child $v \in R^{j+1}_V$ do
4          add $v$ to $R^j_V$;    ▷ (Eqn.(7))
5          add $c(v)$ to $R^j_W$;    ▷ (Eqn.(8))
6      end
7      for child $v \in R^{j+1}_V$ do
8          add $v$ to $R^j_W$;    ▷ (Eqn.(8))
9      end
10    for non-child $v \in N_k(p^j(\omega^{-1}(R^j_W)))$ do
11         add $v$ to $R^j_V$;    ▷ (Eqn.(9))
12    end
13    $V^j_{new}|_{R^j_V} \leftarrow A^j V^j|_{R^j_V}$ ;    ▷ (Get next $V_{new}$)
14    $V^j_{new}|_{V^j \setminus R^j_V} \leftarrow V^j|_{V^j \setminus R^j_V}$
15    $W^j_{new}|_{V^j_W} \leftarrow B^j W^j|_{V^j_W}$ ;    ▷ (Get next $W_{new}$)
16    $W^j_{new}|_{W^j \setminus V^j_W} \leftarrow W^j|_{W^j \setminus V^j_W}$ ;
17  end

PROGRESSIVE FAST RECOMPRESSION METHOD AND SYSTEM FOR WAVELET-BASED LARGE-DEFORMED MESH DATA

CROSS-REFERENCES TO RELATED APPLICATIONS

This application is based on and claims priority under 35 U.S.C. 119 to Korean Patent Application No. 10-2020-0063163, filed on May 26, 2020 in the Korean intellectual property office, the disclosures of which are herein incorporated by reference in their entireties.

TECHNICAL FIELD

The following description relates to a three-dimensional (3D) model processing technology.

BACKGROUND OF THE INVENTION

A 3D processing technology is used in various industries because it has high utilization of the technology in that it provide a higher sense of reality and sensation of immersion than a two-dimensional (2D) image.

The augmented reality (AR) and virtual reality (VR) industries are growing with various digital devices along with 3D animation.

AR is a system and technology for providing virtual information for a space and situation by displaying a virtual object generated through computer modeling in a real environment. VR is a system that helps an interaction with a user in a virtual environment by constructing the virtual environment through computer modeling.

Such AR and VR technology are useful as systems that help an interaction with a user by visualizing a virtual environment and a virtual object through computer modeling.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An embodiment of the present disclosure provides a 3D processing technology for efficient deformation and compression of a mesh structure, which is one of schemes for representing 3D data.

An embodiment of the present disclosure provides a recompression technology capable of fast recompressing a mesh after deformation when already compressed mesh data is to be deformed.

In one aspect, there is provided a three-dimensional (3D) processing method executed in a computer system including at least one processor configured to execute computer-readable instructions included in a memory. The 3D processing method includes compressing, by the at least one processor, given mesh data and recompressing the compressed mesh data based on information extracted from the compressed data by propagating the part of a deformed mesh to all meshes when the mesh data is deformed.

According to an aspect, compressing the given mesh data may include compressing the mesh data into binary data capable of progressive restoration.

According to another aspect, compressing the given mesh data may include compressing the mesh data using a wavelet-based progressive compression method.

According to still another aspect, recompressing the compressed mesh data may include updating a mesh region affected by the deformation through a propagation algorithm.

According to still another aspect, updating the mesh region may include recursively propagating a deformed region and updating the mesh region from a finer mesh to a coarser mesh.

According to still another aspect, recompressing the compressed mesh data may include detecting vertices and wavelet coefficients affected by the deformation, and modifying a corresponding element using a filterbank extracted from the compressed data.

According to still another aspect, recompressing the compressed mesh data may include restoring an original mesh by decoding raw data of the mesh data in a compressed format and restoring the original mesh may include extracting vertex coordinates of a mesh having the lowest resolution, wavelet coefficients extracted from removed vertices, and child-parent relations generated by the removed vertices.

According to still another aspect, recompressing the compressed mesh data may include analyzing and compressing a deformed model based on a displacement between an original model of the mesh data and the deformed model and a filterbank extracted from the compressed data and the child-parent relations.

According to still another aspect, compressing the given mesh data may include generating a multi-resolution mesh from the original mesh through a wavelet lifting method for reducing rate distortion between a finer mesh and a coarser mesh, and compressing the multi-resolution mesh using an entropy encoder.

According to still another aspect, recompressing the compressed mesh data may include modifying a mesh region affected by the deformation using a propagation algorithm considering connectivity-preserving deformation between multi-resolution meshes based on the child-parent relations.

According to still another aspect, recompressing the compressed mesh data may include finding a mesh indicative of a difference between initial data and the recompressed data with respect to each of vertices re-sorted based on the child-parent relations, and generating a deformed multi-resolution mesh by modifying the mesh indicative of the difference using a reusable filterbank.

In an aspect, a 3D processing system implemented as a computer includes at least one processor implemented to execute computer-readable instructions included in a memory. The at least one processor includes a compressor configured to compress given mesh data and a recompressor configured to recompress the compressed mesh data based on information extracted from the compressed data by propagating the part of a deformed mesh to all meshes when the mesh data is deformed.

According to various embodiments of the present disclosure, there is provided the recompression technology capable of fast recompressing a mesh after deformation when already compressed mesh data is to be deformed. Accordingly, a high amount of a mesh having many vertexes can be handled, and the restoration and visualization of the mesh becomes further facilitated over a network using the progressive compression technology.

First, if given mesh data is compressed into binary data which may be subjected to progressive restoration and then a customer attempts to perform an additional deformation, such as adding a movement, on corresponding mesh data, a recompression time can be significantly reduced by introducing "the propagator" when the mesh data is deformed based on the needs of the customer and is to be stored. The propagator plays a core role in improving recompression performance by extracting pieces of important information from a previously stored compression file, processing the information, and spreading some of a mesh deformed by a customer to the entire mesh.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, embodiments of the present disclosure are described in detail with reference to the accompanying drawings.

Embodiments of the present disclosure relates to a 3D processing technology for efficient deformation and compression of a mesh structure, which is one of schemes for representing 3D data.

Progressive compression is one of the most effective multi-resolution schemes for sending large 3D meshes in a network environment. However, if 3D meshes are changed, for example, watermarks are added or the pose of models are changed, a deformed 3D mesh model should be compressed again from scratch, which may take too much time especially for large mesh models.

An embodiment of the present disclosure greatly reduces a compression time for deformed models, that is, so-called recompression, when connectivity-preserving deformation is applied to mesh models. First, after a large mesh is progressively compressed using a wavelet-based method, vertices and wavelet coefficients affected by deformed area are extracted using a propagation algorithm including characteristics of the present disclosure. Direct modification acts on required elements using original matrix filters without additional post-processing, thus boosting compression performance.

First, related technologies of the present disclosure are described as follows.

Progressive Mesh Compression

Many progressive approach methods adopt the removal of elements in order to generate a multi-resolution mesh. Simplification may be performed by folding edges in a mesh surface and removing vertexes prioritized by a proper rule. These priority-based deletion and recovery schemes typically have high granularity levels as much as the number of elements of each mesh. Most of the schemes are designed to be resilient by preserving mesh connectivity, but may not guarantee full restoration in a reconstructing process.

Furthermore, spectral approaches also have been researched using mesh Laplacian. A Laplacian operator projects geometry coordinates from a spatial domain to a frequency domain to enable frequency analysis. Eigenvectors for a mesh Laplacian matrix form an $R^n$ orthogonal basis, and their corresponding eigenvalues are considered as frequencies. Spectral coefficients for low frequencies are quantized and entropy coded, thus building a good approximation for an initial mesh. There is a trade-off between high computational complexity and compression efficiency, but later works eliminate the eigenvector decomposition or reduce a computational cost for a mapping method.

A wavelet-based approach for a progressive mesh uses a subdivision scheme to generate irregular meshes. An initial mesh is progressively decimated with subdivision rules that contain subdivisions of each triangle face into 4, 3, 2, or an original face. Connectivity data includes all face subdivision operations, and geometry data is encoded using a proposed wavelet lifting or lazy scheme. Later works improve compression performance for an original wavemesh using a method based on Gaussian probability models to predict inserted vertices, face directions, and edge flips from the geometry. This wavelet-based method is applied to various applications, such as online transmission of a web 3D simulation.

If a full reconstruction is not crucial, several approaches improve compression performance. Distortion of a relatively low rate is achieved in several image-based methods, cutting a mesh and mapping geometry to a plane. Furthermore, a wavelet-based scheme is adopted to decorrelate original data and to produce semiregular meshes. Since connectivity-oblivious schemes do not consider the restoration of an original mesh, a data loss occurs and only readable meshes may be generated.

Deformation and Compression

Deformation that preserves mesh connectivity may be considered in compression context that focuses on dynamic mesh sequences. In some studies, the temporal scalability of triangular meshes are considered with the same connectivity and proposed wavelet-based dynamic mesh sequence compression. Such an algorithm finds temporal coherence for a vertex geometry using temporal wavelet filtering, using a relatively simple approach that is scalable in the frame rate. The temporal coherence has been widely used in many dynamic mesh sequence compressions. In another study, temporal coherence is applied to propose a progressive streaming technique by implementing a temporal frame clustering algorithm based on vertex trajectory curvature. Thereafter, frames in a cluster are compressed by storing only vertex geometry differences between consecutive frames. A dynamic mesh may be considered as a generalization of mesh deformation, but most of previous studies cannot handle large meshes due to frame-based representations of the mesh sequence.

Handling Region-of-Interest (ROI) of Large Mesh

A large mesh has been developed to efficiently deal with regions-of-interest (ROIs) on progressive meshes. In some studies, a progressive algorithm with clustering based on an initial meaningful segmentation is proposed to provide random accessibility to compressed large meshes. Clustering is achieved by splitting a mesh into several connected regions along concave discontinuity. Each mesh portion is then encoded by a modified version of a progressive encoder. In another study, a POMAR encoder, which does not require initial segmentation of an input model was proposed. The POMAR encoder generates clusters by dividing a vertex split hierarchy and achieves efficient compression performance. In other studies, a hierarchical structure, mainly focusing on a performance trade-off between a compression rate and a visualization factor is generated. The structure called nSP-tree contains SP-cells and allows independent encoding and decoding of each cell, enabling interactive visualization and out-of-core compression.

A later wavelet-based approach is proposed to allow for prioritizing ROIs over the background on the encoding side and transmitting encoded data such that quality within the ROIs increases first. The encoder-side prioritizing is generalized to the decoder-side, enabling users to choose arbitrary ROIs on mesh at any level and to decode the ROIs with arbitrarily resolution. Such methods enable user-interactions and add user functionality to restore a mesh. However, modifying mesh geometry at finest granularity is not addressed.

Hereinafter, detailed embodiments of a progressive fast recompression technology for wavelet-based deformed large mesh data according to the present disclosure are described.

Progressive mesh compression is applied to reduce a file size and to also allow a serialized application to progressively increase reconstructed mesh resolution. Only a relatively small portion of data is sent to a receiver and decoded into mesh objects for each serializing step, thus having lower resolution than a complete dataset. A user may see large mesh outlines at first glance for an environment with an uneven network speed. However, the existing technology is specialized in generating readable data, not in modifiable data. For example, if 3D meshes are changed, such as adding watermarks or changing the pose of models, mesh data should be first fully decoded, deformed, and compressed again from scratch. Especially, for a large mesh, deformation is hard to be considered due to its long compression time.

In an embodiment of the present disclosure, compression after a modification on a mesh which has been progressively compressed before, that is, recompression, is considered. Many previous studies related to progressive compression focus on a single raw mesh or a dynamic mesh, and the first compression of a mesh is considered. In general, direct modification of encrypted data is quite laborious. If the original mesh is restored for deformation, information which may be obtained from the first compression is not used. In order to speed up recompression after mesh deformation, a novel method using information obtained from the first compression is proposed.

A key concept is mesh wavelets, which may be defined as having detailed signal representation information for a mesh. If bi-orthogonal wavelets are adopted, it provides high locality for extracted coefficients, which helps map a user-specific ROI to groups of coefficients when connectivity-preserving deformations are applied to the mesh.

Consequently, only a small part of compressed mesh data may be directly influenced by the deformation, which can boost recompression speed.

An embodiment of the present disclosure proposes a propagation algorithm for updating mesh regions affected by deformation. A propagation process includes detecting vertices and wavelet coefficients to be changed in each level, and directly modifying elements using a filterbank extracted from an original-compressed mesh file. An initial deformed ROI is recursively propagated and updated from the finest mesh to the coarsest mesh, thus generating a new multi-resolution mesh which may be directly encoded to a compressed format.

The result is compatible with the original entropy encoder and decoder used in the first compression.

A 3D mesh dataset including very large meshes is used. After models are compressed using the best practice wavelet-based progressive method, a recompression method proposed hereinafter is used for the second compression after mesh deformation.

Figure 1:
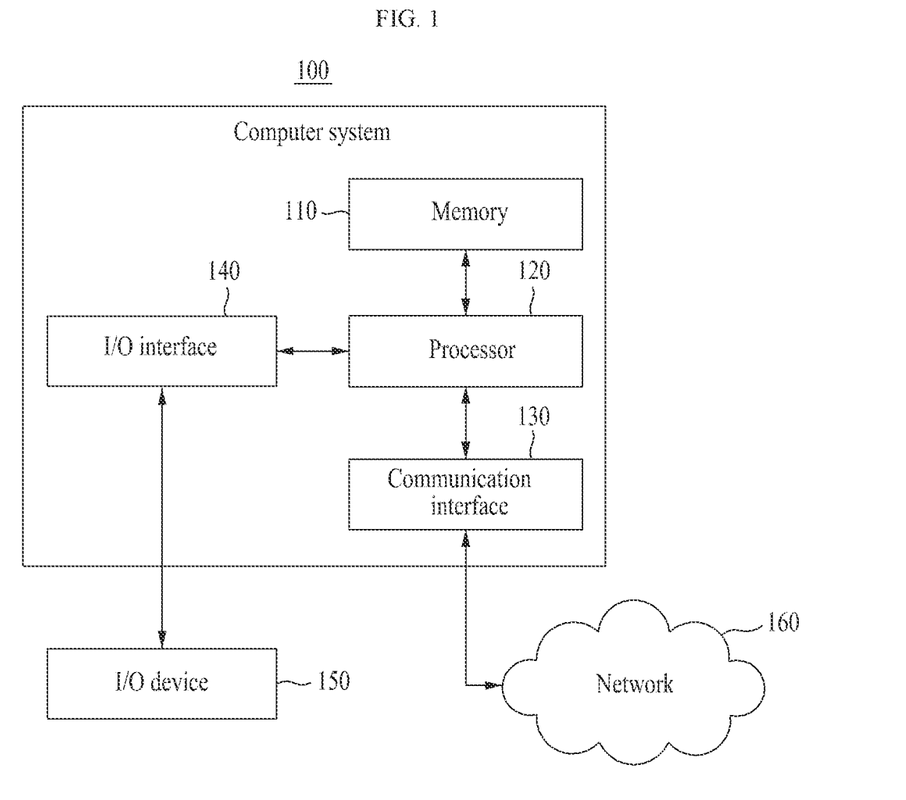
FIG. 1 is a block diagram for describing an example of an internal configuration of a computer system according to an embodiment of the present disclosure.

FIG. 1 is a block diagram illustrating an example of a computer system 100 according to an embodiment of the present disclosure. A 3D processing system according to an embodiment of the present disclosure may be implemented by the computer system 100 configured like FIG. 1.

As illustrated in FIG. 1, the computer system 100 is a component for executing a 3D processing method according to embodiments of the present disclosure, and may include a memory 110, a processor 120, a communication interface 130, and an input/output (I/O) interface 140.

The memory 110 is a computer-readable storage medium, and may include permanent mass storage devices, such as a random access memory (RAM), a read only memory (ROM) and a disk drive. In this case, the permanent mass storage device, such as a ROM and a disk drive, may be included in the computer system 100 as a permanent storage device separated from the memory 110. Furthermore, an operating system and at least one program code may be stored in the memory 110. Such software components may be loaded from a computer-readable storage medium, separated from the memory 110, to the memory 110. Such a separate computer-readable storage medium may include computer-readable recording media, such as a floppy drive, a disk, a tape, a DVD/CD-ROM drive, and a memory card. In another embodiment, software components may be loaded onto the memory 110 through the communication interface 130 not a computer-readable storage medium. For example, the software components may be loaded onto the memory 110 of the computer system 100 based on a computer program installed by files received over the network 160.

The processor 120 may be configured to process instructions of a computer program by performing basic arithmetic, logic and I/O operations. The instructions may be provided to the processor 120 by the memory 110 or the communication interface 130. For example, the processor 120 may be configured to execute received instructions based on a program code stored in a recording device, such as the memory 110.

The communication interface 130 may provide a function for enabling the computer system 100 to communicate with other devices over the network 160. For example, a request, an instruction, data or a file generated by the processor 120 of the computer system 100 based on a program code stored in a recording device, such as the memory 110, may be provided to other devices over the network 160 under the control of the communication interface 130. Inversely, a signal, an instruction, data or a file from another device may be received by the computer system 100 through the communication interface 130 of the computer system 100 over the network 160. The signal, instruction or data received through the communication interface 130 may be transmitted to the processor 120 or the memory 110. The file received through the communication interface 130 may be stored in a storage device (i.e., the aforementioned permanent storage device) which may be further included in the computer system 100.

The communication method is not limited, and may include short-distance wireless communication between devices in addition to communication methods using communication networks (e.g., a mobile communication network, wired Internet, wireless Internet, a broadcasting network and a satellite network) which may be included in the network 160. For example, the network 160 may include one or more given networks of a personal area network (PAN), a local area network (LAN), a campus area network (CAN), a metropolitan area network (MAN), a wide area network (WAN), a broadband network (BBN), and the Internet. Furthermore, the network 160 may include one or more of network topologies, including a bus network, a star network, a ring network, a mesh network, a star-bus network, and a tree or hierarchical network, but is not limited thereto.

The I/O interface 140 may be means for an interface with an I/O device 150. For example, the input device may include a device, such as a microphone, a keyboard, a camera or a mouse. The output device may include a device, such as a display or a speaker. For another example, the I/O interface 140 may be means for an interface with a device in which functions for input and output have been integrated into one, such as a touch screen. The I/O device 150, together with the computer system 100, may be configured as a single device.

Furthermore, in other embodiments, the computer system 100 may include components greater or smaller than the components of FIG. 1. However, it is not necessary to clearly illustrate most of conventional components. For example, the computer system 100 may be implemented to include at least some of the I/O devices 150 or may further include other components, such as a transceiver, a camera, various sensors, and a database.

Figure 2:
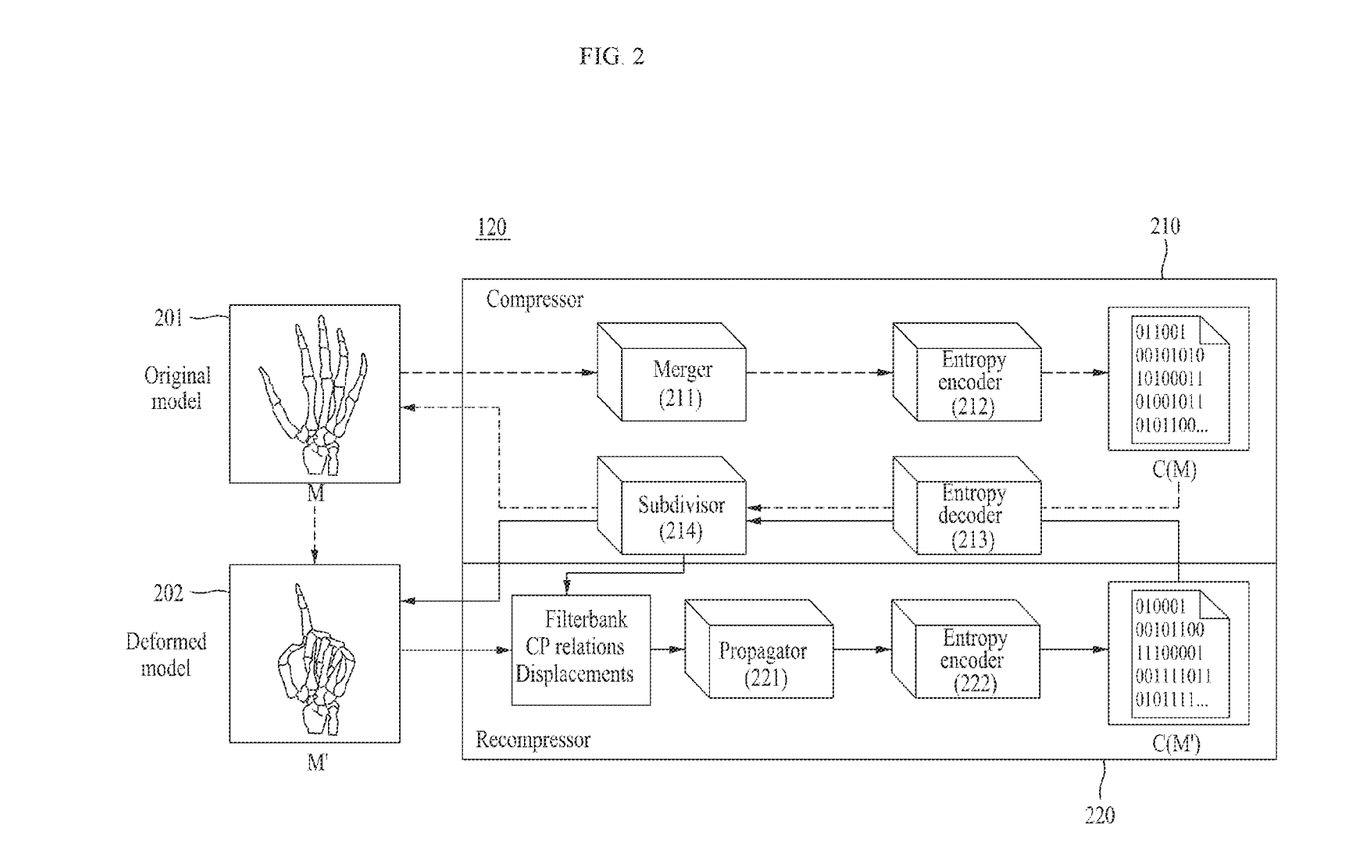
FIG. 2 is a diagram illustrating an example of components which may be included in the processor of the computer system according to an embodiment of the present disclosure.

FIG. 2 is a diagram illustrating an example of components which may be included in the processor of the computer system according to an embodiment of the present disclosure.

As illustrated in FIG. 2, the processor 120 of the computer system 100 may include a compressor 210 and a recompressor 220. The compressor 210 may include a merger 211, an entropy encoder 212, an entropy decoder 213, and a subdivisor 214. The recompressor 220 may include a propagator 221, and an entropy encoder 222.

FIG. 2 illustrates recompression architecture using an original model (M) 201 and a deformed model (M') 202. A displacement between the original model (M) 201 and the deformed model (M') 202 is input to the propagator 221 along with a filterbank extracted from an original compression binary file C(M) and a child-parent (CP) relation. The recompressor 220 generates a compressed binary file C(M'). In this case, the compressed binary file C(M') may be reconstructed by the entropy decoder 213 and subdivisor 214 of the compressor 210.

Specifically, the compressor 210 functions to progressively compress or restore a mesh using a wavelet-based method.

The recompressor 220 analyzes the deformed model (M') 202 and rapidly compresses again through the propagator 221, that is, a core of a recompression scheme of the present disclosure. The compressor 210 makes exactly the same result as the result produced by the merger 211.

The merger 211 lowers resolution of an irregular triangle mesh using a wavemesh. The merger 211 first traverses each mesh face in order to look for a matching case from three types of merging codebooks. Vertices are removed when such cases are identified, and mesh connectivity is renewed to form a triangular surface. A mesh is decimated using a lazy filter without considering its geometry structure. After all faces are traversed, another mesh having slightly lower resolution is generated from the original mesh, wavelet coefficients are extracted from each removed vertex and used for further compression. A merging process is repeated until no face remains that matches a possible case. A wavelet lifting scheme is used to reduce rate distortion between finer and coarser meshes. Thus, multi-resolution meshes are obtained from the original mesh.

Like the wavemesh, the multi-resolution meshes generated by the merger 211 are compressed by the entropy encoder 212. The entropy encoder 212 compresses the lowest resolution mesh coordinates and all the wavelet coefficients using adaptive arithmetic coding. Analysis and synthesis filterbanks are recursively generated at each resolution (having elements only 0, 1, or 0.5 due to a lazy scheme) using rounding transforms. Connectivity is compressed bitwise according to rules applied upon merging.

The subdivisor 214 restores the original mesh by decoding its raw data in a compressed format. An underlying assumption is that a mesh to be deformed by a user must be completely restored through the subdivisor 214. For fast recompression, upon restoration, the propagator 221 extracts and reuses next data: (1) vertex coordinates in the lowest resolution mesh, (2) all wavelet coefficients extracted from removed vertices, and (3) child-parent relations generated by the removed vertices, that is, a child, and corresponding vertices that support the child at both sides of a newly generated edge, that is, a parent.

The propagator 221 finds unit elements that need to be recalculated for a user-modified region on the mesh. The merger 211 creates strong connections among multi-resolution mesh sequences represented by the child-parent relations. For each relocated vertex, the propagator 221 recursively finds elements in the entire mesh sequence that cause differences between initial data and recompressed data. Since only connectivity-preserving deformations are considered, the differences appear only at vertex coordinates and wavelet coefficients. Such a property is called locality. Two groups of elements, which may be directly affected by a region modification, are searched for using the propagation algorithm. Finally, the elements are recalculated and recompressed.

The propagation algorithm according to an embodiment of the present disclosure is specifically described below.

In order to propagate an ROI, that is, in order to propagate a mesh region modified by a user, the relationship between any vertex pair on a mesh surface is clarified. The vertex pairs are connected through all the mesh resolutions using various maps.

Hereinafter, in an embodiment, it is assumed that an irregular triangle mesh may iteratively generate coarser meshes and wavelet coefficients.

It is assumed that $M^j$ is a j-th coarser mesh generated from an original mesh $M^J$, $V^j$ is a set of vertex points in $M^j$, and $W^j \subset \mathbb{R}^3$ is a set of wavelet coefficients. After decomposition, child-parent relations $R_{CP} \subset V^j \times V^j$ is established so that each child has exactly two parents. Then, a children set containing every child induced from $R_{CP}^j$ is defined as $V_C^j$, and a parent set containing every parent having a relationship with at least one child is defined as $V_P^j$. For simplicity, $V_{NC}^j$, that is, a non-child set equivalent with $V^j \setminus V_C^j$ is defined. Then, $V^j$ and $W^j$ are recursively defined from $M^J$ to coarsest mesh $M^{j_o}$.

$$V^{j-1} = \mu^j(V_{NC}^j) \tag{1}$$

$$W^{j-1} = \omega^j(V_C^j) \tag{2}$$

where μ and ω are bijective functions that map a vertex to a vertex and maps a vertex to a wavelet coefficient, respectively. The two functions are well defined because each child vertex v in $V_C^j$ provides exactly one wavelet coefficient. The reason for this is that a wavemesh for the compression scheme is adopted.

$$\omega^j(v) = v - \overline{p^j(v)} \tag{3}$$

wherein $p^j$ maps each child on $M^j$ to a parent set, and $\overline{\cdot}$ indicates the arithmetic mean.

There is defined a $R_V^j$ vertex set in a specific ROI on the original mesh $M^J$ where each element has its new coordinate by changing their geometry. Then, each element in $R_V^j$ starts its propagation by the algorithm according to the present disclosure, and is matched with another element in one of the two sets $R_V^j$ or $R_W^j$ at a j-th level. In this case, $R_V^j \subset V^j$ is remaining vertices and $R_W^j \subset W^j$ is wavelet coefficients corresponding to removed vertices, both of which are propagated from a (j+1)-th level.

Hereinafter, further detailed information on the recursive derivation of $R_V^j$ and $R_W^j$ is provided.

Locality

Wavelet coefficients have locality. This means that each wavelet coefficient is affected by only its neighborhood. According to Equation 3, each wavelet coefficient depends on only three elements: a child vertex and two parent vertices all close to each other on a mesh surface. A region may be larger due to a k-disk bi-orthogonal construction adopted for original compression, but all of the child vertex and two parent vertices are within the area of a radius k from the corresponding child vertex. Such a property prevents a given local region from being scattered anywhere on the mesh.

Moreover, analysis and synthesis filterbanks support the importance of wavelet locality. Both the analysis and synthesis filterbanks are projection matrices from (j+1)-th mesh vertices to j-th mesh vertices and wavelets (and vice versa) and are defined as follows.

$$V^j = A^j V^{j+1} \tag{4}$$

$$W^j = B^j V^{j+1} \tag{5}$$

$$V^{j+1} = P^j V^j + Q^j W^j \tag{6}$$

where $A^j$ and $B^j$ denote j-th analysis filters, and $P^j$ and $Q^j$ denote j-th synthesis filters. Theoretically, the filters are generated from scaling and wavelet functions related to only mesh connectivity by their definitions. Thus, the two kinds of filters identically remain even after connectivity-preserving deformation to a mesh. Accordingly, a fast recompression algorithm to be described later is produced using the filters and the child-parent relations without additional computation.

Vertex Propagation

To transfer vertices from a finer mesh to a coarser mesh is considered. Starting with the finest case, with a mesh $M^J$ and a modified region $R_V^J$. Any point in $R_V^J$ is either a child vertex, a parent vertex, or neither. Assuming the lazy scheme referred in the wavemesh, every non-child vertex identically remains at $M^{J-1}$ during a decimation process. If a modified vertex is a non-child, a corresponding vertex in $V^{J-1}$ also needs to be modified. Accordingly, assuming that the finest mesh ROI $R_V^J$ has been generated in advance from a user input, a propagated region $\hat{R}_V^{J-1}$ is first derived from $M^{J-1}$ as below.

Figure 3:
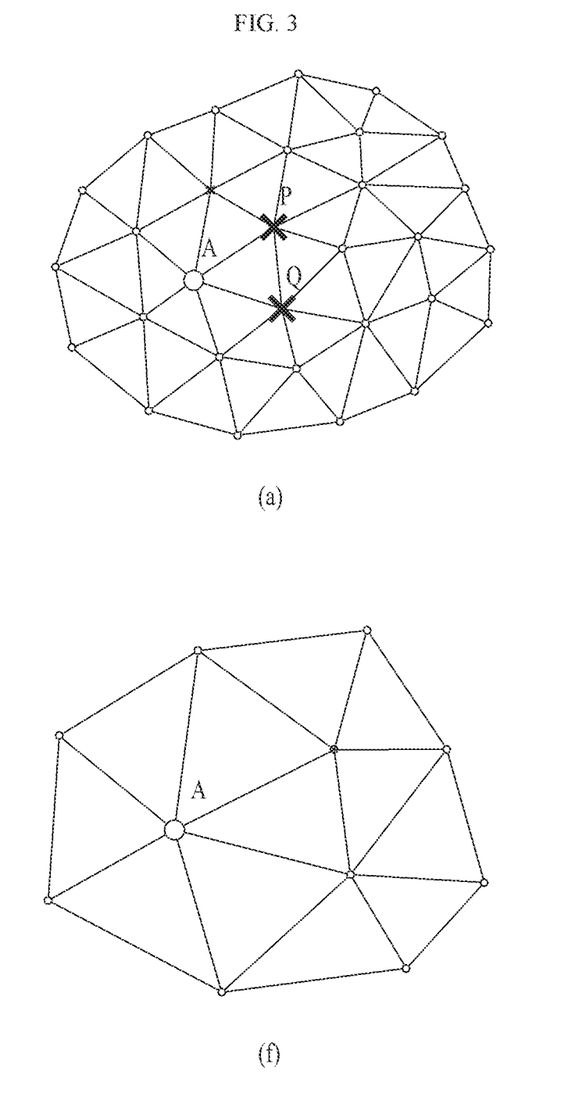
FIGS. 3 to 6 illustrate examples of a propagation process using a mesh simplified from top to bottom according to an embodiment of the present disclosure.

In the case of $v^j \in R_V^j \cap V_{NC}^j$, $$\hat{R}_V^{j-1} := \{v^{j-1} \in V^{j-1} | v^{j-1} = \mu^j(v^j)\} \tag{7}$$

where the hat notation indicates the lazy scheme has been applied. A vertex propagation example is illustrated in the same mesh (FIGS. 3(a) and 3(b)). When $R_V^j$ composed of points A, P, and Q is considered, only a non-child vertex A is detected to become an element of $\hat{R}_V^{j-1}$. $\hat{R}_V^{j-1}$ is expanded by considering the wavelet lifting scheme.

Wavelet Propagation

A vertex from a finer mesh transferred to a wavelet for a coarser mesh is considered. As discussed above, only objects affected by a vertex relocation are other vertices or wavelets. Wavelet coefficients are mainly influenced by two factors derived from Equation 3.

1. If a child vertex exists in a current region, it directly affects a corresponding wavelet coefficient.

2. If a child vertex has some vertex in a current region as its parent, it also affects a corresponding wavelet coefficient.

Accordingly, propagated wavelet coefficients $R_W^{j-1}$ on $M^{J-1}$ are as follow.

Figure 4:
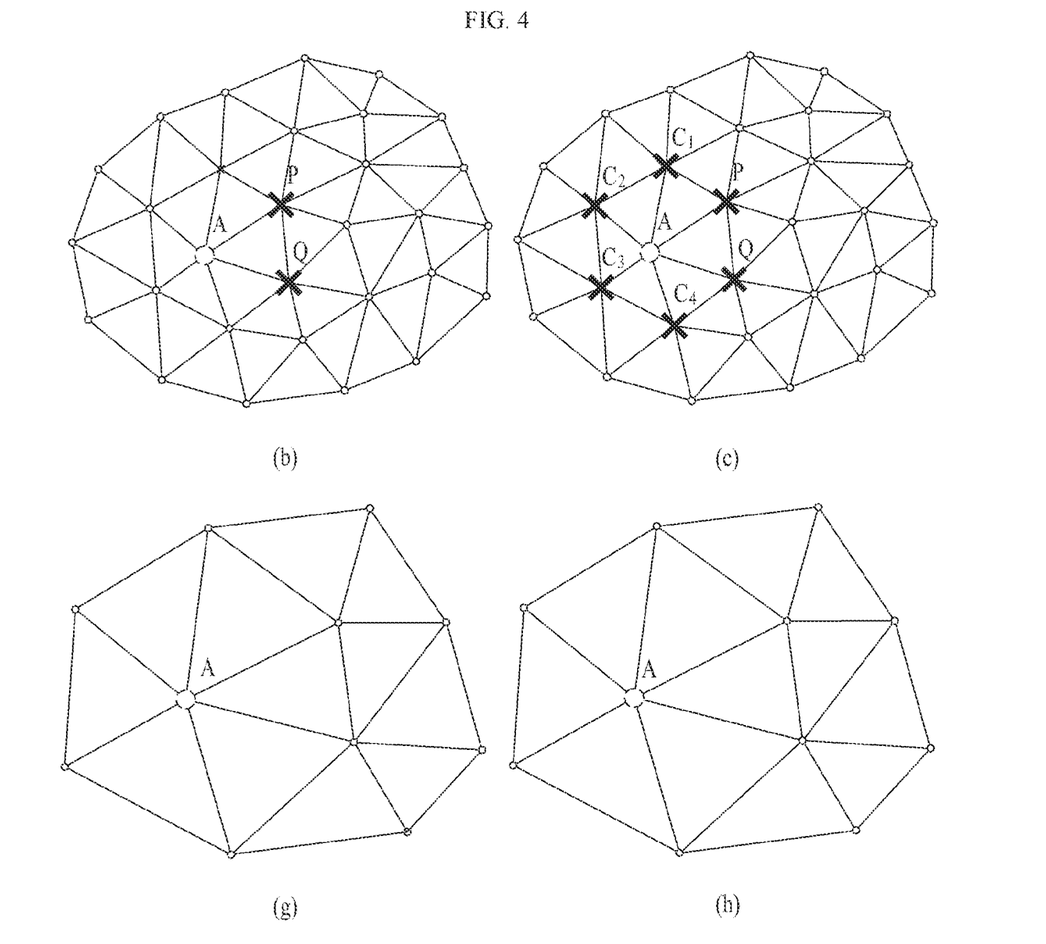

In the case of $v^j \in (R_V^j \cap V_C^j) \cup c^j(R_V^j \cup V_P^j)$, $$R_W^{j-1} := \{w^{j-1} \in W^{j-1} = \omega^j(v^j)\} \tag{8}$$

where $c^j$ maps each vertex to its children set on $M^j$. Again in the sample mesh (FIGS. 4(b), 4(c), 4(g), and 4(h)), wavelet propagation on $M^J$ detects child vertices P and Q and also C1, C2, and C3, that is, children of a parent vertex A in $R_V^j$. Such vertices become elements of $R_W^{j-1}$.

Orthogonal Propagation

Upon merging, the k-disk lifting scheme is used to improve orthogonality between the wavelet function and the scaling function of mesh wavelet. From a visual perspective, some vertices make a small perturbation to their neighbors, thus reducing a visual difference between successive mesh resolutions. Points that cause the perturbation are every parent vertex, that is, at least one of its children corresponds to the element in $W^j$. The variable k denotes the radius of a circular region where the neighbors live. If this scheme is applied to the ROI, a region may be obtained from $R_W^{j-1}$ using Equation 9.

In the case of $v^j \in N_k(p^j(\omega^{-1}(R_W^{j-1}))) \cup V_{NC}^j$, $$R_V^{j-1} := \hat{R}_V^{j-1} \cap \{v^{j-1} \in V^{j-1} | v^{j-1} = \mu^j(v^j)\} \tag{9}$$

In order to find parent vertices, corresponding children are obtained from $\omega^{-1}(R_W^{j-1})$. $p^j$ is mapping from an arbitrary child vertex to a corresponding set of parents in $M^j$. Thereafter, in order to reflect k-disk lifting, circular regions are each produced to have a radius k centered at each of the parent. In order to include all points within the region, $N^k$ that maps an arbitrary vertex to a set of its neighbors within the radius k is defined. Finally, only non-child vertices (i.e., not to be removed) are added to $\hat{R}_V^{j-1}$ obtained above in order to create the expanded propagated region $R_V^{j-1}$.

Figure 5:
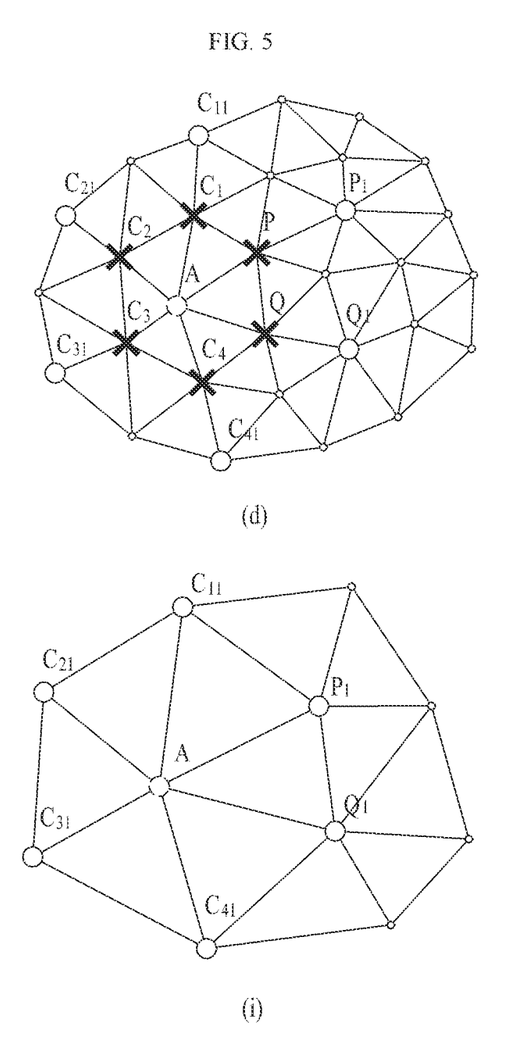

FIGS. 5(d) and 5(i) illustrate detailed processes. In orthogonal propagation, all children vertices (marked as x) in $R_W^{j-1}$ and their parents (marked as a solid circle) are targeted. Then, non-child vertices are searched for within a distance of the radius k from each parent vertex. Assuming 0-disk lifting, only the parent vertices are added to $\hat{R}_V^{j-1}$, resulting in an expanded region $R_V^{j-1}$.

Region of Interest (ROI) Modification

After the propagation from $M^J$ to $M^{J-1}$, the found objects are recalculated. The analysis filters A and B are main component for the calculation and are easily extracted from the previously compressed data. As described above, the reusability of the filterbank is ensured by locality. Since only the propagated regions $R_V^j$ and $R_W^j$ are computed, a compression speed much faster than recalculating entire geometry may be expected.

Figure 6:
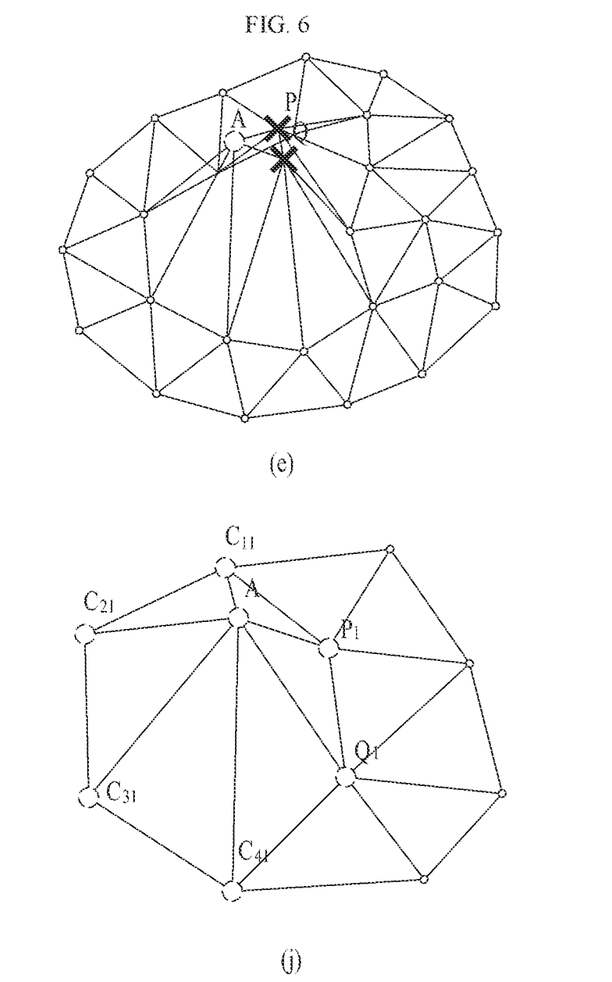

FIGS. 6(e) and 6(f) illustrate an example of a corresponding case. After three different propagations on $M^J$, $R_V^{j-1}$ and $R_W^{j-1}$ are obtained. An analysis filter $A^{j-1}$ is used to relocate the vertices in $R_V^{j-1}$ and a filter $B^{j-1}$ is used to recalculate wavelet coefficients corresponding to the children vertices in $R_W^{j-1}$.

Finally, the entire propagation process may be summarized as follows.

Complete Algorithm

Figure 7:
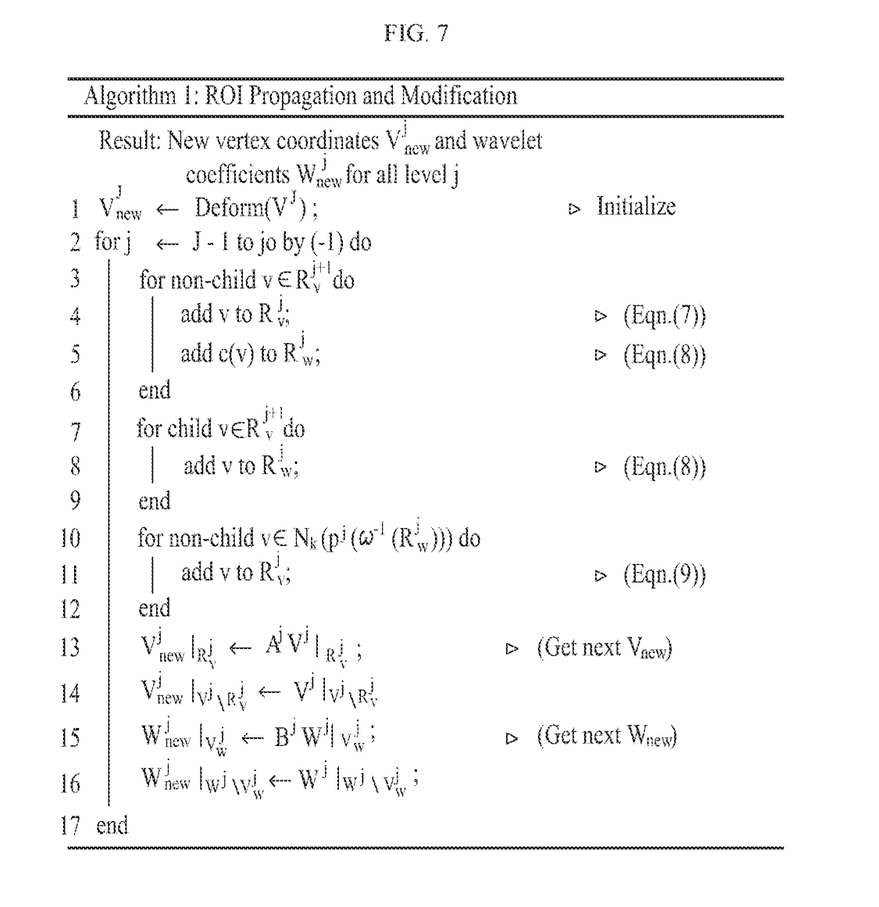
FIG. 7 illustrates an example of an algorithm for region of interest (ROI) propagation and modification according to an embodiment of the present disclosure.

The algorithm 1 of FIG. 7 shows a complete algorithm capable of propagating the user-specified ROIs over the multi-resolution mesh. The algorithm starts to sequentially execute Equations 7, 8 and 9 on the finest mesh $M^J$ and obtain vertices and wavelets on a coarser mesh. Thereafter, the vertices and wavelets are modified using the reusable filterbank. This process is recursively performed down to the coarsest mesh, thus creating deformed multi-resolution mesh data.

FIGS. 3 to 6 illustrate all the propagation processes using meshes, and illustrate propagation processes singularized from top to both. FIG. 3 illustrates a vertex propagation process. FIG. 4 illustrates a wavelet propagation process and a process of detecting a child and a child of non-child vertices. FIG. 5 illustrates an orthogonal propagation process using 0-disk lifting. FIG. 6 illustrates a modification example corresponding to vertices of a propagated region.

Figure 8:
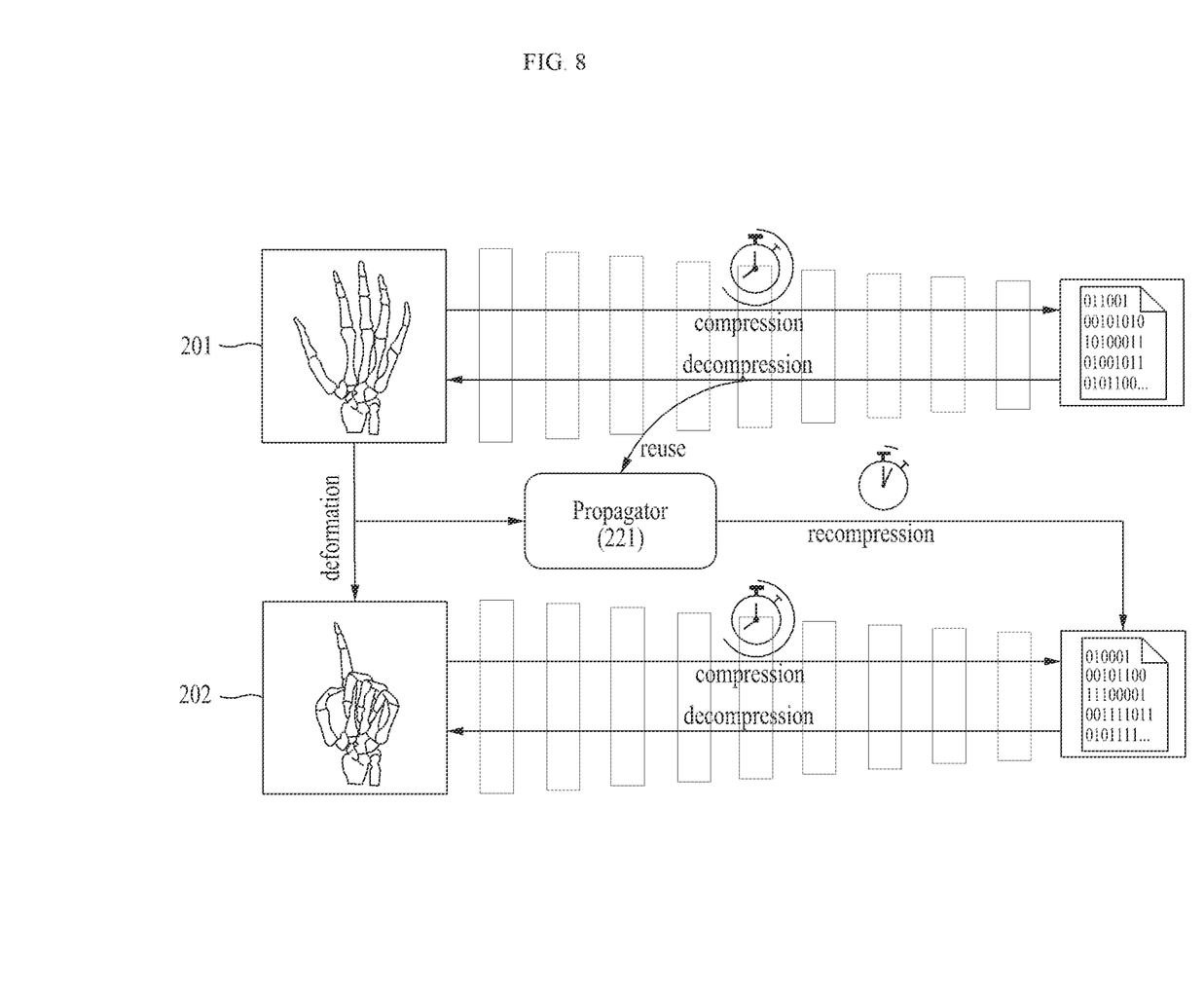
FIG. 8 illustrates an example of a recompression process using a propagator according to an embodiment of the present disclosure.

In general, a large mesh whose transmission over a network is difficult has a disadvantage in that post management of a compressed mesh is difficult because there is a difficulty in restoration if compression performance is high. In order to overcome such a limit, in an embodiment of the present disclosure, as illustrated in FIG. 8, if mesh data already compressed by a customer is to be deformed, the mesh can be rapidly compressed again after the deformation. First, if given mesh data is compressed into binary data which may be progressively restored and then a customer attempts to additionally deform the mesh data, such as adding a movement to the corresponding mesh data, when the mesh data is to be stored again after the mesh data is deformed according to the needs of the customer, a recompression time can be significantly reduced through the propagator 221. The propagator 221 plays a key role in improving recompression performance by extracting pieces of important information from a previously stored compression file (the original file 201), processing the information, and spreading, to all meshes, some of a mesh (the deformation file 202) deformed by the customer.

The present disclosure relates to a technology for the management of compressed meshes through recompression, can provide convenience to a user by adding a function for efficiently modifying compressed data, and can significantly reduce the time taken for a recompression process after deformation compared to an initial compression process. Furthermore, a pre-processing task can be simplified by using 3D vertex coordinates without any change for 3D mesh compression. The time taken for an unnecessary pre-processing process can be reduced using irregular meshes for compression without any change while dealing with geometric compression along with the connectivity of a mesh.

Figure 9:
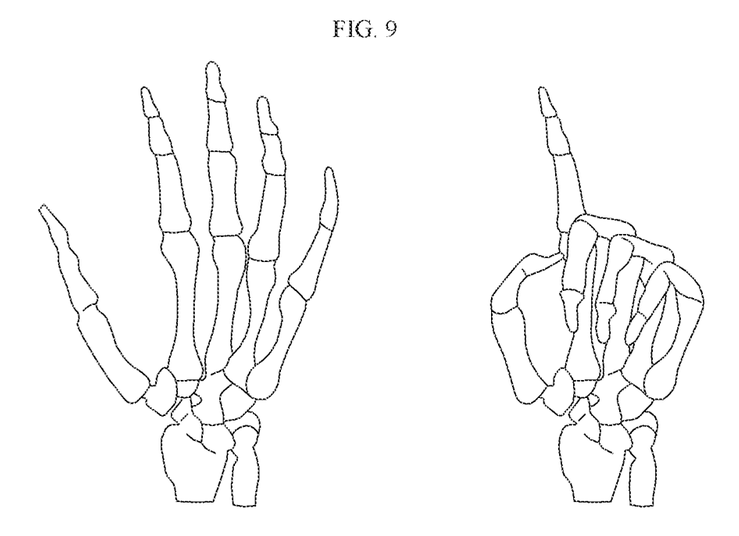
FIGS. 9 and 10 illustrate examples of connectivity-preserving deformation according to an embodiment of the present disclosure.
Figure 10:
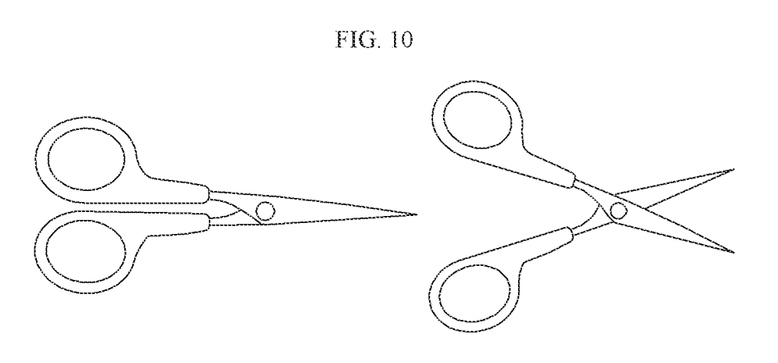

FIGS. 9 and 10 illustrate examples of connectivity-preserving deformation. FIG. 9 illustrates an example in which two connected components of a scissors model are rotated in different directions with respect to a center point. FIG. 10 illustrates an example in which each joint of a hand model moves to change its pose.

There are two important issues which can rapidly compress a new mesh.

First, the existing compression file can be reused. The analysis filters A and B and the synthesis filter basically have a very high compression cost. Assuming only connectivity-preserving deformation, requirements for a calculation time are significantly reduced because the filters are not calculated again.

Second, locality is used to modify only a local ROI region affected by a user-specified ROI. In general, it may be expected that a user will deform only a small portion of a large mesh. Accordingly, the algorithm is designed in a way to reduce a propagation time for local deformation.

As described above, according to embodiments of the present disclosure, if already compressed mesh data is to be deformed, the recompression technology capable of rapidly compressing a mesh again after deformation is applied. Accordingly, a large mesh having many vertices can be handled. The restoration and visualization of a mesh over a network can be further facilitated using the progressive compression technology.

The aforementioned device may be implemented by a hardware component and/or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, a code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and the data may be stored in one or more computer-readable recording media.

The method according to various embodiments may be implemented in the form of a program instruction executable by various computer means and stored in a computer-readable storage medium. In this case, the medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. A three-dimensional (3D) processing method executed in a computer system comprising at least one processor configured to execute computer-readable instructions included in a memory, wherein the 3D processing method comprises:
   compressing, by the at least one processor, given mesh data; and
   recompressing the compressed mesh data based on information extracted from the compressed data by propagating the part of a deformed mesh to all meshes when the mesh data is deformed,
   wherein compressing the given mesh data comprises compressing the mesh data using a wavelet-based progressive compression method.

2. The method of claim 1, wherein recompressing the compressed mesh data comprises updating a mesh region affected by the deformation through a propagation algorithm.

3. The method of claim 2, wherein updating the mesh region comprises:
   recursively propagating a deformed region, and
   updating the mesh region from a finer mesh to a coarser mesh.

4. The method of claim 1, wherein recompressing the compressed mesh data comprises:
   detecting vertices and wavelet coefficients affected by the deformation, and
   modifying a corresponding element using a filterbank extracted from the compressed data.

5. The method of claim 1, wherein:
   recompressing the compressed mesh data comprises restoring an original mesh by decoding raw data of the mesh data in a compressed format, and
   restoring the original mesh comprises extracting vertex coordinates of a mesh having a lowest resolution, wavelet coefficients extracted from removed vertices, and child-parent relations generated by the removed vertices.

6. The method of claim 1, wherein recompressing the compressed mesh data comprises analyzing and compressing a deformed model based on a displacement between an original model of the mesh data and the deformed model and a filterbank extracted from the compressed data and the child-parent relations.

7. The method of claim 6, wherein compressing the given mesh data comprises:
   generating a multi-resolution mesh from the original mesh through a wavelet lifting method for reducing rate distortion between a finer mesh and a coarser mesh, and
   compressing the multi-resolution mesh using an entropy encoder.

8. The method of claim 7, wherein recompressing the compressed mesh data comprises modifying a mesh region affected by the deformation using a propagation algorithm considering connectivity-preserving deformation between multi-resolution meshes based on the child-parent relations.

9. The method of claim 7, wherein recompressing the compressed mesh data comprises:
   finding a mesh indicative of a difference between initial data and the recompressed data with respect to each of vertices re-sorted based on the child-parent relations; and
   generating a deformed multi-resolution mesh by modifying the mesh indicative of the difference using a reusable filterbank.

10. A three-dimensional (3D) processing method executed in a computer system comprising at least one processor configured to execute computer-readable instructions included in a memory, wherein the 3D processing method comprises:
    compressing, by the at least one processor, given mesh data; and
    recompressing the compressed mesh data based on information extracted from the compressed data by propagating the part of a deformed mesh to all meshes when the mesh data is deformed,
    wherein compressing the given mesh data comprises compressing the mesh data into binary data capable of progressive restoration.

11. A three-dimensional (3D) processing system implemented as a computer, comprising:
    at least one processor implemented to execute computer-readable instructions included in a memory,
    wherein the at least one processor comprises:
    a compressor configured to compress given mesh data; and
    a recompressor configured to recompress the compressed mesh data based on information extracted from the compressed data by propagating the part of a deformed mesh to all meshes when the mesh data is deformed,
    wherein the compressor is configured to compress the mesh data using a wavelet-based progressive compression method.

12. The 3D processing system of claim 11, wherein the recompressor is configured to:
- update a mesh region affected by the deformation through a propagation algorithm,
- recursively propagate a deformed region, and
- update the mesh region from a finer mesh to a coarser mesh.

13. The 3D processing system of claim 11, wherein the recompressor is configured to:
- detect vertices and wavelet coefficients affected by the deformation, and
- modify a corresponding element using a filterbank extracted from the compressed data.

14. The 3D processing system of claim 11, wherein the recompressor is configured to:
- restore an original mesh by decoding raw data of the mesh data in a compressed format, and
- extract vertex coordinates of a mesh having a lowest resolution, wavelet coefficients extracted from removed vertices, and child-parent relations generated by the removed vertices.

15. The 3D processing system of claim 11, wherein the recompressor is configured to analyze and compress a deformed model based on a displacement between an original model of the mesh data and the deformed model and a filterbank extracted from the compressed data and the child-parent relations.

16. The 3D processing system of claim 15, wherein the compressor is configured to:
- generate a multi-resolution mesh from the original mesh through a wavelet lifting method for reducing rate distortion between a finer mesh and a coarser mesh, and
- compress the multi-resolution mesh using an entropy encoder.

17. The 3D processing system of claim 16, wherein the recompressor is configured to modify a mesh region affected by the deformation using a propagation algorithm considering connectivity-preserving deformation between multi-resolution meshes based on the child-parent relations.

18. The 3D processing system of claim 16, wherein the recompressor is configured to:
- find a mesh indicative of a difference between initial data and the recompressed data with respect to each of vertices re-sorted based on the child-parent relations; and
- generate a deformed multi-resolution mesh by modifying the mesh indicative of the difference using a reusable filterbank.

* * * * *